Nov. 29, 1955 — W. D. CROCKER ET AL — 2,725,436
WINDSHIELD WIPING APPARATUS AND PARKING SWITCH THEREFOR
Filed June 27, 1952
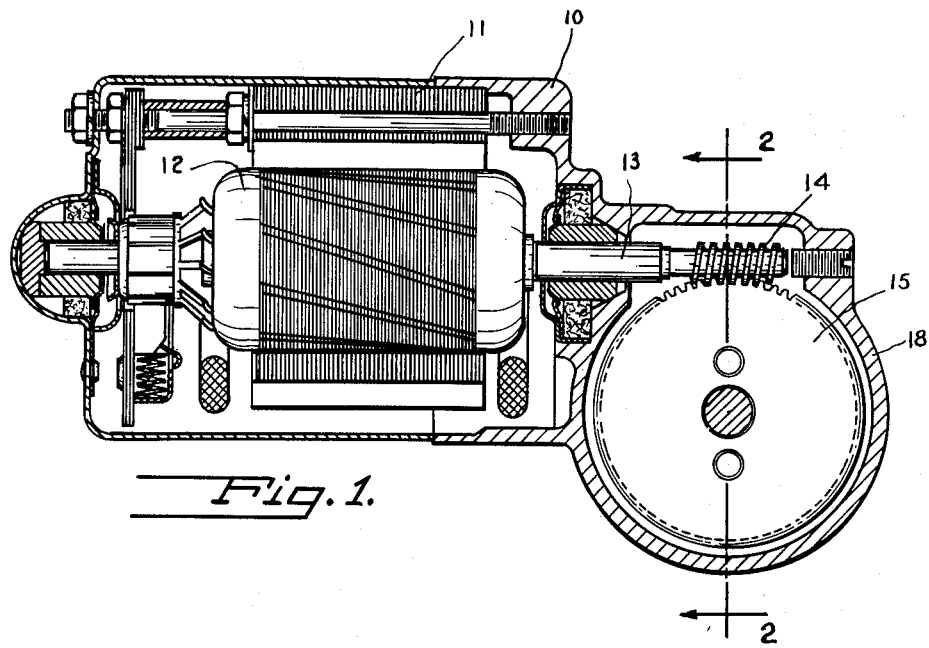
Fig. 1.
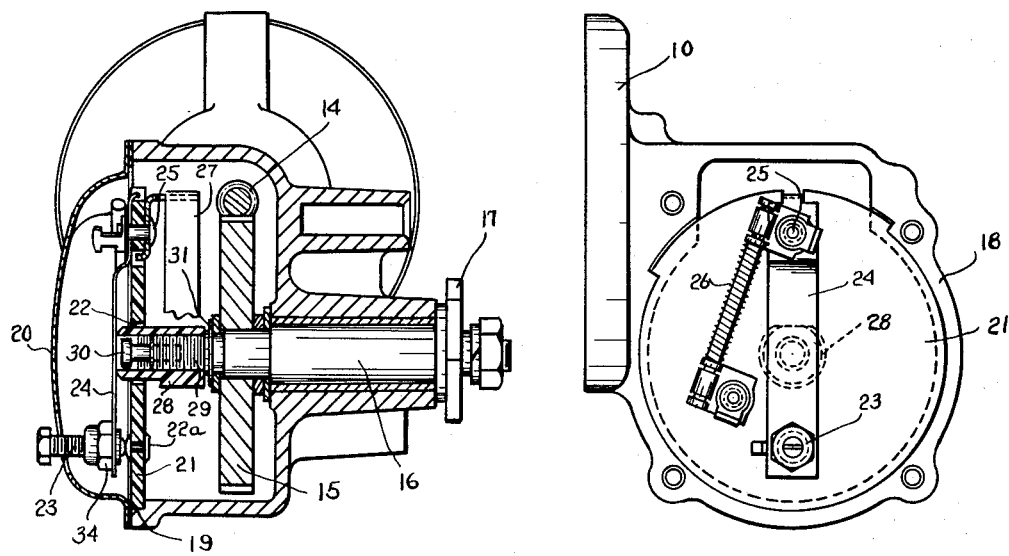
Fig. 2.
Fig. 3.
INVENTORS.
CHARLES STRNISTE
WILLIAM D. CROCKER
BY Raymond A. Paquin
ATTORNEY.

Nov. 29, 1955 W. D. CROCKER ET AL 2,725,436
WINDSHIELD WIPING APPARATUS
AND PARKING SWITCH THEREFOR
Filed June 27, 1952 4 Sheets-Sheet 2

INVENTORS.
CHARLES STRNISTE
WILLIAM D. CROCKER
BY Raymond A. Paquin
ATTORNEY.

INVENTORS.
CHARLES STRNISTE
WILLIAM D. CROCKER
BY Raymond A. Paquin
ATTORNEY.

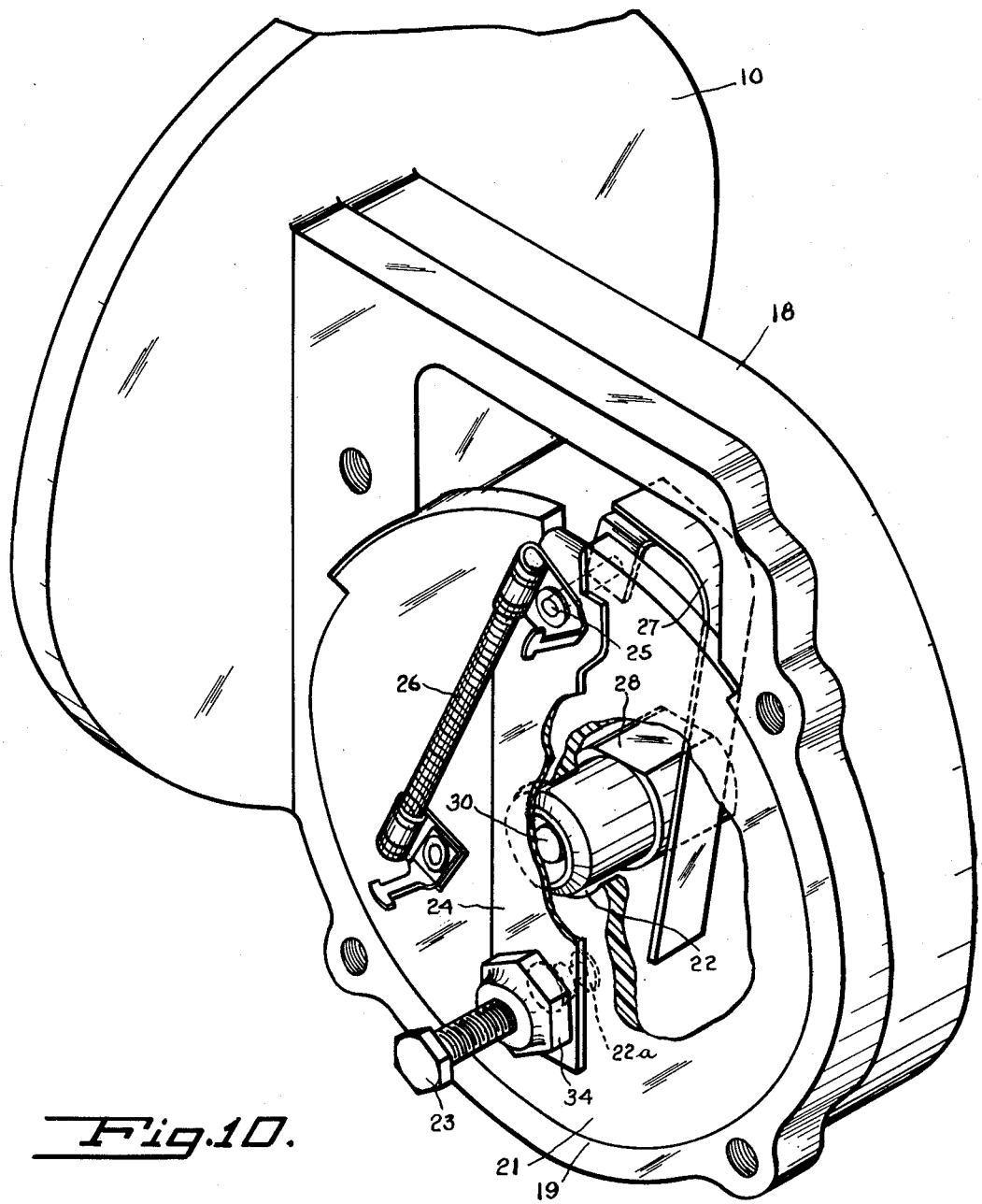

United States Patent Office 2,725,436
Patented Nov. 29, 1955

2,725,436

WINDSHIELD WIPING APPARATUS AND PARKING SWITCH THEREFOR

William D. Crocker, Suffield, and Charles Strniste, Somersville, Conn., assignors to American Bosch Arma Corporation, a corporation of New York Application June 27, 1952, Serial No. 296,052

3 Claims. (Cl. 200—61.39)

This invention relates to windshield wiping apparatus and has particular reference to a new and improved means for controlling the position of parking of the wiping members thereof.

An object of the invention is to provide a new and improved controlled apparatus for electrically actuated windshield wiping mechanism for controlling the position of the wiping members when not in use, that is, in their parking position.

Another object of the invention is to provide a new and improved controlled mechanism of the type set forth which is adapted for use in connection with the apparatus shown in application Serial No. 294,355, filed June 19, 1952, by Miller and Terry, now Patent No. 2,705,812, issued April 12, 1955, and application Serial No. 294,356, filed June 19, 1952, by Miller and Terry, wherein a reversible electric motor is provided with means for varying the effective length of the wiper actuating linkage depending upon the direction of rotation of the motor.

Another object is to provide a parking control switch for windshield wiping apparatus which allows the parking of the wiping members only at the desired location.

Another object is to provide a simple, efficient and economical means for controlling the parking of the wiping members of a windshield wiping apparatus.

Other objects and advantages of the invention will be apparent from the following description taken in connection with the accompanying drawings and it will be understood that changes may be made in the details of construction and arrangement of parts shown and described, as the preferred forms have been given by way of illustration only.

Referring to the drawings:

Fig. 1 is a sectional view of a windshield wiper motor and drive gear mechanism;

Fig. 2 is a sectional view taken on line 2—2 of Fig. 1, looking in the direction of the arrows;

Fig. 3 is a fragmentary view showing the parking control mechanism with the cover plate removed;

Fig. 10 is a perspective view of the device shown in Fig. 2.

Figure 4:
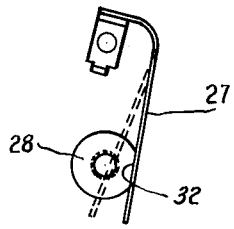
Fig. 4 is a fragmentary view of the parking mechanism.

Referring more particularly to the drawings wherein similar reference characters designate corresponding parts throughout, the invention is intended for use primarily with windshield wiping apparatus of the type employing a reversible electric motor as a source of power, and is also intended primarily for use with apparatus of the type shown in application Serial No. 294,355 and application Serial No. 294,356 wherein effective variable length linkage or actuating means is employed for parking the wiping elements or members outside of the normal wiping pattern.

The reversible motor shown in Fig. 1 comprises the housing 10 having the stator or pole shoes 11 and rotor 12 and the drive shaft 13 having the worm gear 14 thereon, meshing with gear 15 on drive shaft 16 on which is positioned the link driving lug 17 for connection to the actuating linkage of the wiping mechanism and adapted to oscillate the wiping members upon rotation of gear 15 and shaft 16.

The drive gear housing 18 is provided with the peripheral shoulder 19 and is adapted to be enclosed by the cover plate 20.

On the shoulder 19 is positioned the switch plate 21 having the central opening 22 for the purpose hereinafter described.

The switch plate 21 is of insulation or non-conducting material and carries the stationary contact 22a and movable contact 23 which is carried by leaf spring 24 which is secured to plate 21 by suitable means such as the rivet 25. Also secured on plate 21 is the field resistor 26.

On the opposite side of plate 21 is positioned the leaf spring or cam spring 27 which is also retained in position on the plate 21 by means of rivet 25.

Leaf spring 27 is so positioned as to normally extend over opening 22 and is adapted to engage the periphery of threaded cam 28 which is of insulated material and which has a threaded portion in threaded engagement with the threaded extension 29 on gear shaft 16. In the end of threaded extension 29 is the stud or stop pin 30, the head of which has a diameter greater than the internal diameter of the internal threaded portion on threaded cam 28 and, therefore, limits the extent of movement of cam 28 on shaft extension 29 in an outward direction. Shaft 29 has the shoulder 31 for limiting the extent of movement of cam 28 in the opposite direction.

Cam 28 has the cam surface 32 adapted to be engaged by the leaf spring 27 for unthreading cam 28 on threaded shaft extension 29 in an outward direction.

Figure 5:
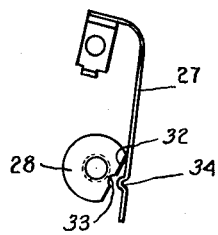
Fig. 5 is a view similar to Fig. 4, but showing a slightly modified form of the invention.
Figure 6:
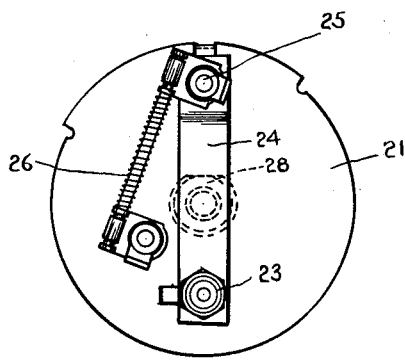
Fig. 6 is a front or face view of the switch plate embodied in the apparatus shown in Fig. 3.
Figure 7:
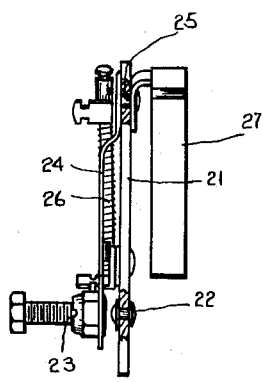
Fig. 7 is a side view of the device shown in Fig. 6.
Figure 8:
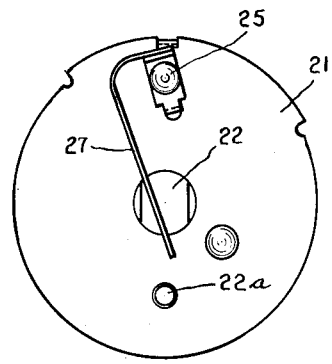
Fig. 8 is a rear view of the device shown in Fig. 6.

The construction shown in Fig. 5 is similar to that shown in Fig. 4, except that in Fig. 5 the cam surface 32 is provided with an indentation 33 and the leaf spring 29 has a similar indentation 34 adapted to project into the recess or identation 33 for providing a better lock between the cam surface 32 and leaf spring 27 as hereinafter described.

Contact 23 is threaded through lock nut 34 secured on spring 27 for providing adjustment to thereby adjust the switch gap opening between contacts 23 and 22a.

Figure 9:
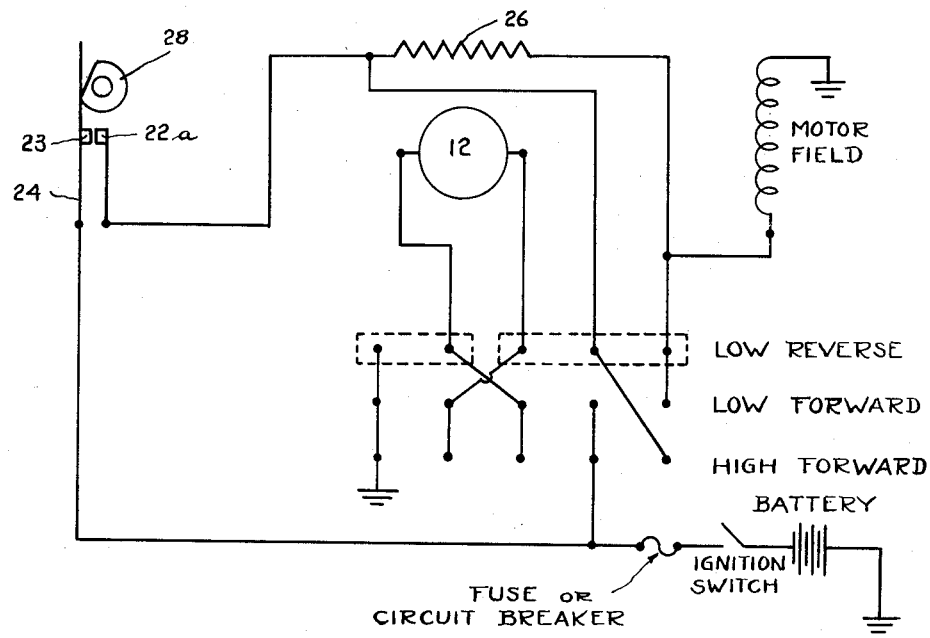
Fig. 9 is a schematic view of the wiring diagram of the wiping apparatus.

In Fig. 9, there is shown schematically the motor and control switch therefor for the motor control switch and parking control switch for further illustrating the operation of the invention.

This view shows the location of the control means in the wiper circuit and the various features of the circuit which are titled for reference and also in this view there is shown schematically the operation of the present invention in the wiper circuit.

It will be noted that the motor is intended to have at least two speeds in the forward or wiping direction and need only have a single speed in the reverse or parking direction.

In operation the motor rotates the gear 15 and actuates the drive linkage in a forward or wiping direction at which time the cam 28 is threaded onto shaft extension 29 until it abuts stop 31 and then continues to rotate relative to leaf spring 27 so long as the drive gear is rotated in a forward or wiping direction.

When the wiping control switch is moved to the off position for shutting off the wiper motor and parking the wiping members, the switch throws the motor into a low reverse direction which reverses the direction of rotation of gear 15 and automatically effect a lengthening of the drive linkage as set forth in application Serial No. 294,355 or application Serial No. 294,356 set forth above for shifting the wiping pattern to a position where the wiping member will be parked outside of its normal wiping pattern or angle.

At the same time the direction of rotation of gear 15 is reversed, leaf spring 27 engages the cam surface 32 on cam 28 and holds the cam stationary and allows the threaded extension 29 on shaft 16 to move cam 28 outwardly relative to shaft extension 29 through opening 22 in switch plate 21, and when the outer end of cam 28 engages leaf spring 24 carrying contact 23 it automatically moves contact 23 away from contact 22, thus breaking the contact and cutting off further current to the motor.

The length of cam 28 is such and the relative location of the various elements are such that the contacts 23 and 22a will be disconnected when the wiping members or blades are in desired parking position.

From the foregoing it will be seen that we have provided simple, efficient and economical means for obtaining all of the objects and advantages of the invention.

We claim:

1. In a device of the character described, a reversible electric motor, gear means operatively connected to and adapted to be driven in opposite directions by said motor, a shaft for said gear means, said shaft being operatively connected to a windshield wiper mechanism for actuating the same, threaded means on said shaft adjacent one end thereof, a cam member having a threaded portion engaging said threaded means on said shaft and a flexible contact carrying arm adjacent said cam member and adapted to be adjusted by said cam member upon rotation of said cam in one direction and resilient means engaging said cam and adapted to prevent rotation of said cam when said shaft is rotated in a direction whereby said threaded connection effects movement of said cam relative to said shaft.

2. In a device of the character described, a reversible electric motor, gear means operatively connected to and adapted to be driven in opposite directions by said motor, a shaft for said gear means, said shaft being operatively connected to a windshield wiper mechanism for actuating the same, threaded means on said shaft adjacent one end thereof, a cam member having a threaded portion engaging said threaded means on said shaft and a flexible contact carrying arm adjacent said cam member and adapted to be adjusted by said cam member upon rotation of said cam in one direction and a leaf spring engaging said cam and adapted to prevent rotation of said cam when said shaft is rotated in a direction whereby said threaded connection effects movement of said cam relative to said shaft.

3. In a device of the character described, a reversible electric motor, gear means operatively connected to and adapted to be driven in opposite directions by said motor, a shaft for said gear means, said shaft being operatively connected to a windshield wiper mechanism for actuating the same, threaded means on said shaft adjacent one end thereof, a cam member having a threaded portion engaging said threaded means on said shaft and a flexible contact carrying arm adjacent said cam member and adapted to be adjusted by said cam member upon rotation of said cam in one direction and a leaf spring engaging said cam and adapted to prevent rotation of said cam when said shaft is rotated in a direction whereby said threaded connection effects movement of said cam relative to said shaft, said leaf spring and cam having mating surfaces.

References Cited in the file of this patent

UNITED STATES PATENTS

| | | |
|---|---|---|
| 1,537,774 | Kalbach | May 12, 1925 |
| 1,964,199 | Evans | June 26, 1934 |
| 2,155,681 | Price | Apr. 25, 1939 |
| 2,513,247 | Morton | June 27, 1950 |
| 2,611,116 | Latta et al. | Sept. 16, 1952 |